US007164649B2

(12) United States Patent
Walton et al.

(10) Patent No.: US 7,164,649 B2
(45) Date of Patent: Jan. 16, 2007

(54) ADAPTIVE RATE CONTROL FOR OFDM COMMUNICATION SYSTEM

(75) Inventors: Jay R. Walton, Westford, MA (US); John W. Ketchum, Harvard, MA (US); Steven J. Howard, Ashland, MA (US); Mark Wallace, Bedford, MA (US)

(73) Assignee: Qualcomm, Incorporated, San Diego, CA (US)

( * ) Notice: Subject to any disclaimer, the term of this patent is extended or adjusted under 35 U.S.C. 154(b) by 964 days.

(21) Appl. No.: 10/001,178

(22) Filed: Nov. 2, 2001

(65) Prior Publication Data

US 2003/0086371 A1    May 8, 2003

(51) Int. Cl.
*H04J 11/00* (2006.01)
*H04L 1/00* (2006.01)

(52) U.S. Cl. .................................. 370/203; 370/252
(58) Field of Classification Search ............ 370/203, 370/252, 253, 465, 208
See application file for complete search history.

(56) References Cited

U.S. PATENT DOCUMENTS

| 4,438,511 | A | | 3/1984 | Baran .......................... 370/204 |
|---|---|---|---|---|
| 5,056,109 | A | | 10/1991 | Gilhousen et al. ........... 370/342 |
| 5,265,119 | A | | 11/1993 | Gilhousen et al. ........... 370/335 |
| 5,799,005 | A | | 8/1998 | Soliman ....................... 370/335 |
| 5,903,554 | A | | 5/1999 | Saints .......................... 370/342 |
| 5,933,421 | A | * | 8/1999 | Alamouti et al. ............ 370/330 |
| 6,097,972 | A | | 8/2000 | Saints et al. ................. 455/572 |
| 6,175,550 | B1 | * | 1/2001 | van Nee ....................... 370/206 |
| 6,351,499 | B1 | * | 2/2002 | Paulraj et al. ............... 375/267 |
| 6,366,763 | B1 | * | 4/2002 | Ue et al. ........................ 455/69 |
| 6,680,967 | B1 | * | 1/2004 | Westman ...................... 375/148 |

(Continued)

FOREIGN PATENT DOCUMENTS

EP    0918422 A2    5/1999

(Continued)

OTHER PUBLICATIONS

Philip A. Bello, "Characterization of Randomly Time-Variant Linear Channels," IEEE Trans. Communications, vol. CS-11, Dec. 1963 (pp. 360-393).

(Continued)

*Primary Examiner*—Min Jung
(74) *Attorney, Agent, or Firm*—Philip R. Wadsworth; Sandip (Micky) S. Minhas; Dmitry R. Milikovsky

(57) ABSTRACT

Techniques to adaptively control the rate of a data transmission in a wireless (e.g., OFDM) communication system. In an aspect, various types of metrics may be derived and used to select the proper rate for the data transmission. Some types of metrics relate to different characteristics of the communication channel, such as SNR, frequency selectivity, time selectivity, and so on. One type of metric relates to the performance of the data transmission. In another aspect, the various types of metrics may be used in different manners to adaptively control the rate. Some metrics may be used for open-loop control of the rate, other metrics may be used for closed-loop control, and some may be used for both. For example, the channel metrics may be used to determine or select the rate, and the performance metrics may be used to determine whether or not to adjust the rate.

39 Claims, 5 Drawing Sheets

U.S. PATENT DOCUMENTS

| | | | |
|---|---|---|---|
| 6,700,881 B1* | 3/2004 | Kong et al. | 370/335 |
| 6,760,882 B1* | 7/2004 | Gesbert et al. | 714/774 |
| 7,012,883 B1* | 3/2006 | Jalali et al. | 370/208 |
| 7,020,073 B1* | 3/2006 | Kadous et al. | 370/208 |
| 2002/0006167 A1* | 1/2002 | McFarland | 375/260 |
| 2002/0106010 A1* | 8/2002 | Jones | 375/219 |
| 2003/0043928 A1* | 3/2003 | Ling et al. | 375/267 |
| 2003/0097623 A1* | 5/2003 | Razavilar et al. | 714/704 |
| 2003/0128674 A1* | 7/2003 | Kong et al. | 370/320 |
| 2005/0276344 A1* | 12/2005 | Ling et al. | 375/260 |

FOREIGN PATENT DOCUMENTS

| | | |
|---|---|---|
| EP | 1094629 A2 | 4/2001 |
| WO | 0054473 A1 | 9/2000 |
| WO | 0156309 A1 | 8/2001 |

OTHER PUBLICATIONS

John A.C. Bingham, "Multicarrier Modulation for Data Transmission: An Idea Whose Time has come," IEEE Communications Magazine, May 1990.

J. G. Proakis, "Digital Communications," 3$^{rd}$ Edition, 1995, McGraw Hill, sections 10-2-2 and 10-3-2.

* cited by examiner

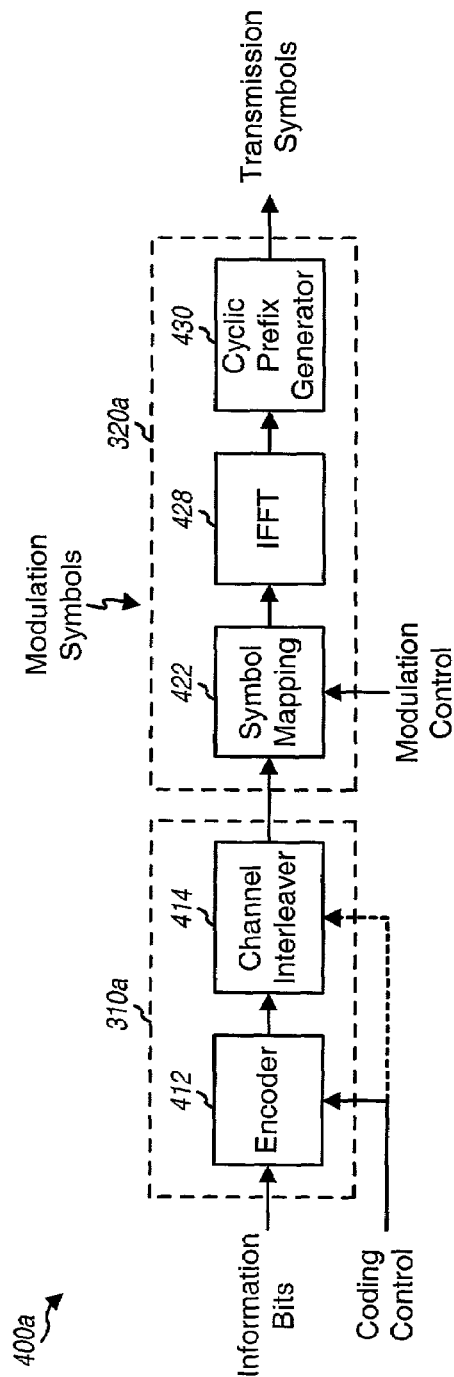
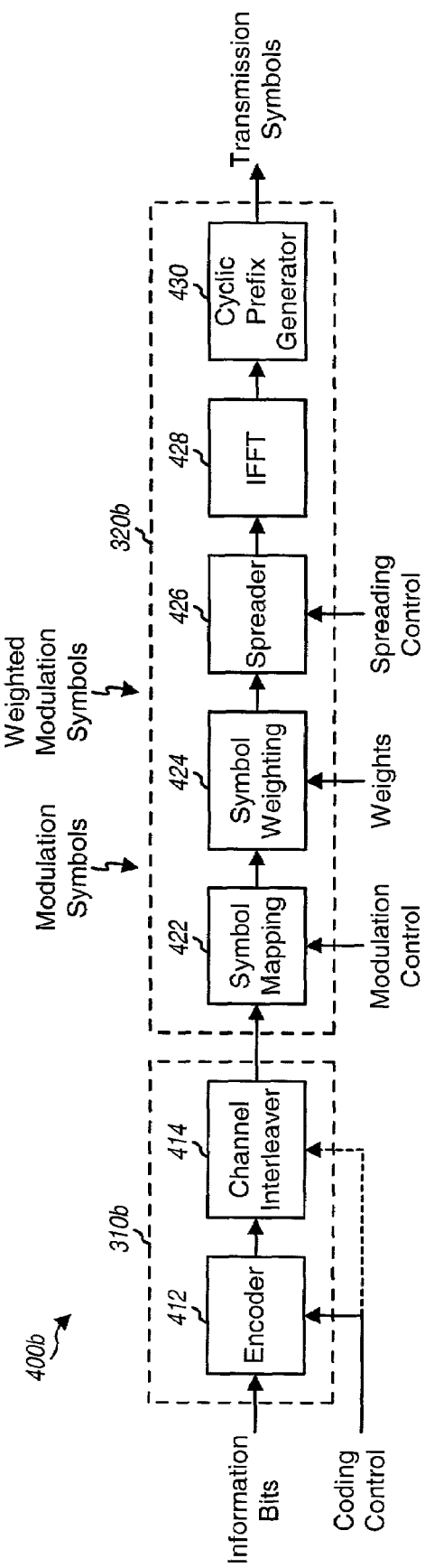
FIG. 4A
FIG. 4B

ADAPTIVE RATE CONTROL FOR OFDM COMMUNICATION SYSTEM

BACKGROUND

1. Field

The present invention relates generally to data communication, and more specifically to adaptive rate control techniques for a wireless (e.g., OFDM) communication system.

2. Background

Wireless communication systems are widely deployed to provide various types of communication such as voice, data, and so on. These systems may be based on code division multiple access (CDMA), time division multiple access (TDMA), frequency division multiple access (FDMA), or some other multiple access technique. Some systems may also implement orthogonal frequency division modulation (OFDM), which may be capable of providing high performance for some channel environments.

In an OFDM system, the system bandwidth is effectively partitioned into a number of ($N_F$) sub-bands (which may be referred to as frequency bins or subchannels). Each frequency subchannel is associated with a respective subcarrier upon which data may be modulated, and thus may be viewed as an independent "transmission channel". Typically, the data to be transmitted (i.e., the information bits) is encoded with a particular coding scheme to generate coded bits, and the coded bits may further be grouped into non-binary symbols that are then mapped to modulation symbols based on a particular modulation scheme (e.g., QPSK, QAM, or some other scheme). At each time interval that may be dependent on the bandwidth of each frequency subchannel, a modulation symbol may be transmitted on each of the $N_L$ frequency subchannels.

The frequency subchannels of an OFDM system may experience different channel conditions (e.g., different fading and multipath effects) and may achieve different signal-to-noise-plus-interference ratios (SNRs). Consequently, the number of information bits per modulation symbol (i.e., the data rate) that may be transmitted on each frequency subchannel for a particular level of performance may be different from subchannel to subchannel. Moreover, the channel conditions typically vary with time. As a result, the supported data rates for the frequency subchannels also vary with time.

A key challenge in a coded OFDM system is the selection of an appropriate "rate" to be used for a data transmission based on channel conditions. This typically involves the selection of a particular data rate, coding scheme (or code rate), and modulation scheme. The goal of the rate selection should be to maximize throughput while meeting quality objectives, which may be quantified by a particular frame error rate (FER), certain latency criteria, and so on.

One straightforward technique for selecting the rate is to "bit load" each frequency subchannel according to its transmission capability, which may be quantified by the subchannel's short-term average SNR. However, this technique has several major drawbacks. First, encoding individually for each frequency subchannel can significantly increase the complexity of the processing at both the transmitter and receiver. Second, encoding individually for each frequency subchannel may greatly increase coding and decoding delay. And third, a high feedback rate may be needed to send channel state information (CSI) indicative of the channel conditions for each frequency subchannel (e.g., the gain, phase, and SNR, or the rate for each frequency subchannel). The feedback from the receiver would be needed to allow the transmitter to properly code and modulate the data on a subchannel-by-subchannel basis.

The different transmission capabilities of the frequency subchannels plus the time-variant nature of the communication channel make it challenging to effectively code and modulate data for transmission in an OFDM system. There is therefore a need in the art for techniques to adaptively control the rate of a data transmission in an OFDM communication system.

SUMMARY

Aspects of the invention provide techniques to adaptively control the rate of a data transmission in a wireless (e.g., OFDM) communication system. In an aspect, various types of metrics may be derived and used to select the proper rate for the data transmission. The rate may be indicative of a specific data rate, coding scheme, and modulation scheme to be used for the data transmission.

Some types of metrics relate to different characteristics of the communication channel, such as SNR, frequency selectivity, time selectivity, and so on. Each channel characteristic may be quantified by one or more different channel metrics. For example, pre-detection SNR and post-detection SNR may be used to quantify SNR, delay spread and coherence bandwidth may be used to quantify frequency selectivity, and coherence time and Doppler spread may be used to quantify time selectivity. One type of metric relates to the performance of the data transmission. Performance may be quantified by frame error rate (FER) and some other decoder metrics.

In another aspect, the various types of metrics may be used in different manners to adaptively control the rate of the data transmission. In particular, some of the metrics may be used for open-loop control of the rate of the data transmission, other metrics may be used for closed-loop control, and some metrics may be used for both open-loop and closed-loop control. For example, the channel metrics for SNR, frequency selectivity, and/or time selectivity may be used to determine or select an initial rate for the data transmission. Thereafter, the rate may be adjusted based on one or more performance metrics. If an adjustment to the rate is desired or deemed to be needed, then a new rate may be determined or selected based on the channel metrics (which may be continually or periodically updated) and possibly the performance metric(s).

Various aspects and embodiments of the invention are described in further detail below. The invention further provides methods, receiver units, transmitter units, receiver systems, transmitter systems, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 4A and 4B are block diagrams of two embodiments of a transmitter unit within the transmitter system.

DETAILED DESCRIPTION

The techniques described herein for adaptively controlling the rate of a data transmission may be used for various wireless communication systems. For clarity, various aspects and embodiments of the invention are described specifically for an OFDM system.

Figure 1:
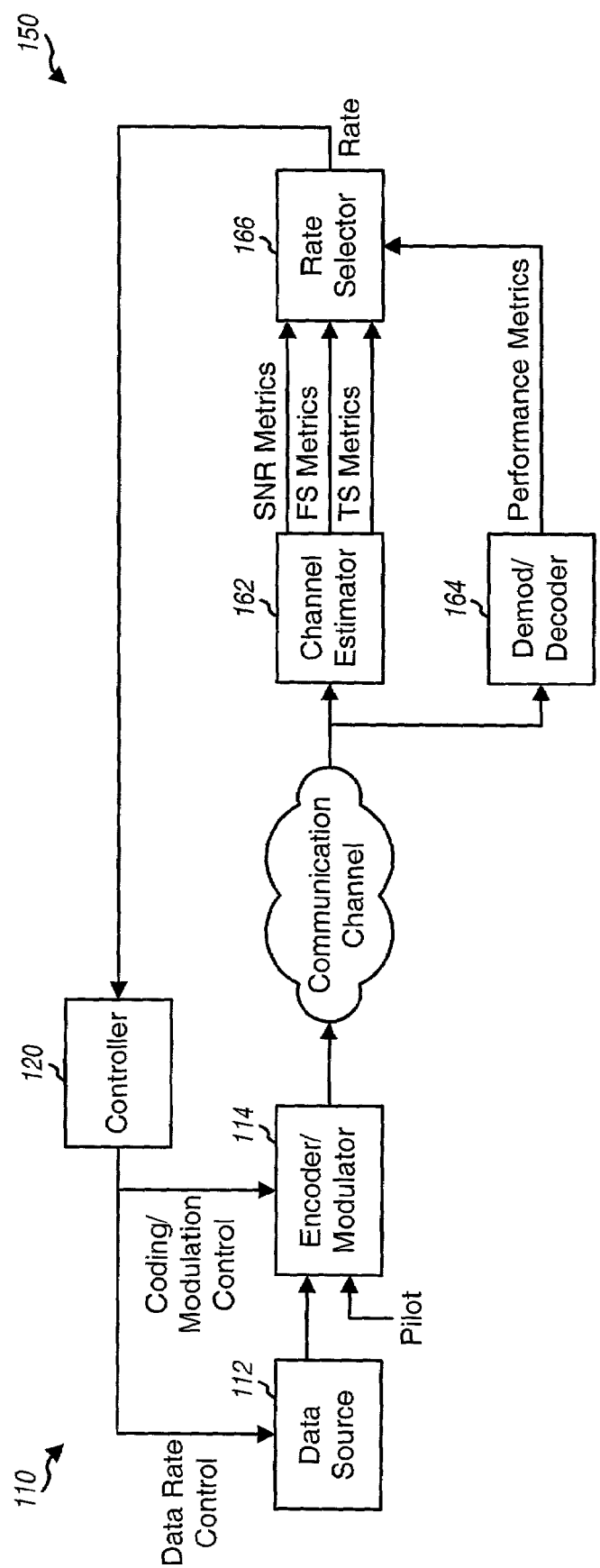
FIG. 1 is a diagram of a simplified model of a wireless (e.g., OFDM) communication system.

FIG. 1 is a diagram of a simplified model of a wireless (e.g., OFDM) communication system. At a transmitter 110, traffic data is provided at a particular data rate from a data source 112 to an encoder/modulator 114, which codes and modulates the data in accordance with a particular coding and modulation scheme. In an embodiment, the data rate is determined by a data rate control and the coding and modulation scheme is determined by a coding/modulation control, both of which are provided by a controller 120 based on a rate received from a receiver 150.

A pilot may also be transmitted to the receiver to assist it perform a number of functions such as acquisition, frequency and timing synchronization, channel estimation, coherent demodulation of data transmission, and so on. In this case, pilot data is provided to encoder/modulator 114, which then multiplexes and processes the pilot data with the traffic data. The modulated data is further processed (not shown in FIG. 1 for simplicity) to generate a modulated signal, which is then transmitted over a communication channel to the receiver.

At receiver 150, the modulated signal is received, conditioned, and digitized to provide data samples. A channel estimator 162 receives and processes the data samples to provide various types of metrics indicative of various characteristics of the communication channel. These various types of channel metrics are described in further detail below. A demodulator/decoder 164 also receives and processes the data samples to provide decoded data, and may further provide one or more performance metrics indicative of the decoded results for the received data.

A rate selector 166 receives the channel metrics from channel estimator 162 and the performance metric(s) from demodulator/decoder 164 and, based on the received metrics, determines a suitable "rate" that may be used for all or a subset of the transmission channels available for use for data transmission (e.g., the frequency subchannels of an OFDM system). The rate is indicative of a specific set of values for a set of transmission parameters. For example, the rate may indicate (or may be mapped to) a specific data rate to be used for the data transmission, a specific coding scheme or code rate, a specific modulation scheme, and so on.

In the embodiment shown in FIG. 1, the rate selection is performed by receiver 150 and the selected rate is provided to transmitter 110. In other embodiments, the rate selection may be performed by the transmitter based on control information provided by the receiver, or may be performed jointly by both the transmitter and receiver.

The communication channel degrades and may further distort the modulated signal transmitted from the transmitter to the receiver. To achieve high performance, the data transmission should be matched to the transmission capability of the channel. This may be achieved by estimating various characteristics of the channel and selecting the proper rate for the data transmission based on the estimated channel conditions.

In accordance with an aspect of the invention, various types of metrics may be derived and used to select the proper rate for a data transmission. Some types of metrics relate to different characteristics of the communication channel such as SNR, frequency selectivity, time selectivity, and possibly others. One type of metric relates to the performance of the data transmission. The various metrics may be categorized as follows:

Signal-to-noise-plus-interference ratio (SNR)—indicative of the signal power over the noise and interference power, which determines the receiver's ability to correctly detect the transmitted data;

Frequency selectivity—indicative of the frequency selective nature of the communication channel, and may be viewed as the channel loss as a function of frequency;

Time selectivity—indicative of the temporal nature of the communication channel, which may be quantified by the time interval over which the channel does not change appreciably; and Performance—indicative of the actual achieved performance of the data transmission and may be quantified by a particular frame error rate (FER), packet error rate (PER), bit error rate (BER), or some other measurements or criteria.

Each of the channel characteristics (e.g., SNR, frequency selectivity, and time selectivity) may be quantified by various metrics, as described in further detail below. Various metrics may also be used to quantify performance.

The four different types of metrics enumerated above represent four different types of channel state information (CSI). Other types of metrics for other types of channel state information may also be used for rate selection, and this is within the scope of the invention.

Metrics Based on SNR

The SNR may be determined at the receiver for each group of transmission channels (e.g., frequency subchannels) to be individually processed (e.g., coded and modulated). For example, if a single coding and modulation scheme is to be used for all available frequency subchannels in an OFDM system, then the total SNR may be determined as the ratio of the total received signal power (i.e., the sum of the power in all frequency subchannels) to the total noise power at the receiver. The SNR may be determined at various points along the signal processing path at the receiver. Some of the different SNRs are described below.

Pre-detection SNR is representative of the ratio of the total received signal power to noise plus interference at the receiver input. Pre-detection SNR is typically measured on the received signal after it has been conditioned (e.g., filtered, amplified, and downconverted) and digitized, but before any equalization (described below). The pre-detection SNR may be estimated based on the pilot transmitted along with the data, or the data itself, or a combination of both.

Post-detection SNR is representative of the ratio of the total signal power to the noise plus interference after equalization at the receiver. Theoretical values of post-detection SNR that would be achieved in a single carrier system with equalization may be indicative of the performance of coded OFDM systems, and therefore may be useful for purposes of rate control in an OFDM system. Various types of equalizer may be used to process the received signal in single carrier communication systems to compensate for the distortions in the received signal introduced by the communication channel. Such equalizers may include, for example, a minimum mean square error linear equalizer (MMSE-LE), a decision feedback equalizer (DFE), and others.

The post-detection SNR for an (infinite-length) MMSE-LE may be expressed as:

$$\gamma_{mmse-le} = \frac{1-J_{\min}}{J_{\min}}, \qquad \text{Eq (1a)}$$

where $J_{min}$ is given by $$J_{\min} = \frac{T}{2\pi}\int_{-\pi/T}^{\pi/T}\frac{N_0}{X(e^{j\omega T})+N_0}d\omega, \qquad \text{Eq (1b)}$$

where $X(e^{j\omega T})$ is the folded spectrum of the channel transfer function, $N_0$ is the channel thermal noise, and T is the sampling interval The channel transfer function is representative of the response (e.g., the gain and phase) across the frequency of the channel between the transmitter and receiver.

The post-detection SNR for an (infinite-length) DFE may be expressed as:

$$\gamma_{dfe} = \exp\left[\frac{T}{2\pi}\int_{-\pi/T}^{\pi/T}\ln\left(\frac{X(e^{j\omega T})+N_0}{N_0}\right)d\omega\right] - 1. \qquad \text{Eq (2)}$$

The post-detection SNRs for the MMSE-LE and DFE shown in equations (1) and (2) represent theoretical values. The post-detection SNRs for the MMSE-LE and DFE are also described in further detail by J. G. Proakis, in a book entitled "Digital Communications", 3rd Edition, 1995, McGraw Hill, sections 10-2-2 and 10-3-2, respectively, which are incorporated herein by reference.

The post-detection SNRs for the MMSE-LE and DFE may be estimated at the receiver in a manner described in U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001, and U.S. patent application Ser. No. 09/854,235, entitled "Method and Apparatus for Processing Data in a Multiple-Input Multiple-Output (MIMO) Communication System Utilizing Channel State Information," filed May 11, 2001, all assigned to the assignee of the present application and incorporated herein by reference.

Other techniques for estimating SNR at a receiver are described in U.S. Pat. No. 5,799,005, entitled "System and Method for Determining Received Pilot Power and Path Loss in a CDMA Communication System," issued Aug. 25, 1998, U.S. Pat. No. 5,903,554, entitled "Method and Apparatus for Measuring Link Quality in a Spread Spectrum Communication System," issued May 11, 1999, U.S. Pat. Nos. 5,056,109 and 5,265,119, both entitled "Method and Apparatus for Controlling Transmission Power in a CDMA Cellular Mobile Telephone System," respectively issued Oct. 8, 1991 and Nov. 23, 1993, and U.S Pat. No. 6,097,972, entitled "Method and Apparatus for Processing Power Control Signals in CDMA Mobile Telephone System," issued Aug. 1, 2000, which are all incorporated herein by reference.

Metrics Related to Frequency Selectivity (FS Metrics)

Frequency selectivity of a communication channel may be characterized by the channel transfer function. Frequency selectivity may also be quantified by delay spread in the time domain or a corresponding coherence bandwidth in the frequency domain. The delay spread is indicative of the difference in delay between the earliest arriving path and the latest arriving path in a time-dispersive channel. Coherence bandwidth is inversely related to delay spread, and is indicative of (and is proportional to) the rate of change of the channel transfer function as a function of frequency. Increasingly greater delay spreads correspond to increasingly smaller coherence bandwidths.

The delay spread is a measure of the width of a power delay profile, which is also known as the delay power density spectrum. The power delay profile, P(τ), is the power in the channel impulse response as a function of relative delay, and may be expressed as:

$$P(\tau)=E[|h(\tau,t)|^2], \qquad \text{Eq (3)}$$

where h(τ,t) is the time-varying channel impulse response, E is the expectation operation, and τ represents the relative delay.

An RMS (root mean square) delay spread, $P_{RMS}$, is one possible measure of delay spread and may be expressed as:

$$P_{RMS} = \left[\frac{\int(\tau-\mu_\tau)^2 P(\tau)d\tau}{\int P(\tau)d\tau}\right]^{1/2}, \qquad \text{Eq (4)}$$

where $\mu_\tau$ is the first moment of P(τ). Other possible measures of delay spread include a delay interval ($\tau_{max}-\tau_{min}$) where $\tau_{max}$ is the largest value of τ for which P(τ) is greater than a particular threshold T, and $\tau_{min}$ is the smallest value of τ for which P(τ) is greater than the threshold T. This threshold may be selected so that some particular percentage of the total power in P(τ) is included in the delay interval ($\tau_{max}-\tau_{min}$).

Delay power density spectrum and delay spread are also described in further detail by P. A. Bello in a paper entitled "Characterization of Randomly Time-Variant Linear Channels," IEEE Trans. Communications, vol CS-11, pp 360–393, December 1963, which is incorporated herein by reference.

The coherence bandwidth is a measure of the width of a frequency correlation function, Q(Δf), which may be expressed as:

$$Q(\Delta f)=E[H^*(f,t)H(f+\Delta f,t)], \qquad \text{Eq (5)}$$

where H(f,t) is the time-varying channel transfer function, which is a frequency-domain representation of the time-varying channel impulse response, h(τ,t).

The time-varying channel transfer function, H(f,t), may be derived as a Fourier transform (in the delay dimension) of the time-varying channel impulse response, h(τ,t), as follows:

$$H(f,t)=\int h(\tau,t)e^{-j2\pi f\tau}d\tau. \qquad \text{Eq (6)}$$

As a result of equation (6), the frequency correlation function, Q(Δf), may be derived as a Fourier transform of the power delay profile, P(τ), as follows:

$$Q(\Delta f)=\int P(\tau)e^{-j2\pi\Delta f\tau}d\tau. \qquad \text{Eq (7)}$$

Possible measures of coherence bandwidth include an RMS coherence bandwidth (which may be defined in an analogous manner to the RMS delay spread) or a frequency interval that includes some percentage of the integrated frequency correlation function (which may be defined analogously to the delay interval ($\tau_{max}-\tau_{min}$) described above for delay spread).

Due to the Fourier transform relationship between the power delay profile, $P(\tau)$, and the frequency correlation function, $Q(\Delta f)$, the delay spread and coherence bandwidth are basically different ways of describing the phenomenon of delay dispersion in the communication channel. In fact, the power delay profile and frequency correlation function bear an inverse relationship with each other.

In an OFDM system, the frequency correlation function, $Q(\Delta f)$, is typically more easily measured because information for the frequency subchannels are available. Therefore, the coherence bandwidth may be a more suitable parameter to use to specify the extent of the delay spread in the communication channel and in the rate selection. A small value of coherence bandwidth (relative to the signal bandwidth) indicates that there are many independent fading events across the signal bandwidth, while a large value of coherence bandwidth (relative to the signal bandwidth) indicates flat fading across the signal bandwidth (i.e., all frequency subchannels fade together). The relationship between coherence bandwidth and actual performance typically depends on the details of the code and interleaver designs, and may be determined empirically for specific code and interleaver designs.

Estimation of the coherence bandwidth may be achieved in different manners for different types of systems. In a frequency division duplex (FDD) system, the downlink and uplink are allocated two different frequency bands that are typically associated with different channel responses. Consequently, the communication channel on each of the downlink and uplink may be characterized by a (e.g., pilot) transmission on that channel. In a time division duplex (TDD) system, the downlink and uplink share the same frequency band in a time division multiplexed (TDM) manner. Consequently, the communication channels for the downlink and uplink are substantially the same, with any difference being mainly due to differences in the transmit and receive electronics in the modems at the two ends of the link, and to the temporal nature of the channel (i.e., changes in the channel conditions between the times assigned for downlink and uplink transmissions).

To estimate the coherence bandwidth of the communication channel in an FDD system, the transmitter can send a pilot. In an OFDM system, a pilot symbol comprised of a constant amplitude tone in each of the available frequency subchannels may be sent. For OFDM, the transmitter computes the inverse FFT of the pilot symbol to form an OFDM symbol for the pilot, appends a cyclic prefix to the OFDM symbol to form a transmission symbol, performs digital-to-analog (D/A) conversion of the transmission symbol, and upconverts and transmits the symbol. The receiver samples the received signal, removes the cyclic prefix in the recovered transmission symbol, and computes the FFT of the recovered OFDM symbol. The recovered pilot symbol from the FFT operation yields a scaled estimate of a frequency-domain sampled channel transfer function, $\hat{H}(k/T)$, where T is the sampling interval and k is the index for the frequency bins or sub-bands.

In a time division duplex system, the transmitter can make a rate decision based on its estimates of the communication channel, which may be derived based on pilot symbols sent by the recipient receiver to which data is to be transmitted. In this case, the channel transfer function may be estimated as described above for the FDD system, except that the receiver transmits the pilot symbols (and not the transmitter), and the transmitter receives the pilot and uses it to form an estimate of the channel. Since the transmitter transmits on the same frequency band via which the pilot symbols were received, the transmit channel transfer function, $\hat{H}_{tx}(k/T)$, is substantially the same as the receive channel transfer function, $\hat{H}_{rx}(k/T)$ (i.e., $\hat{H}_{tx}(k/T) \cong \hat{H}_{rx}(k/T)$).

An estimate of the frequency correlation function, $\hat{Q}(l/T)$, may be expressed as:

$$\hat{Q}(l/T) = \frac{1}{N-l} \sum_{k=0}^{N-1-l} \hat{H}^*(k/T)\hat{H}((k+l)/T), \qquad \text{Eq (8)}$$

where N is the dimension of the FFT and l represents frequency delta (i.e., different quantized values of $\Delta f$). The estimate of the frequency correlation function may further be (exponentially) averaged over multiple pilot symbols, as follows:

$$\tilde{Q}_n(l/T) = \alpha \cdot \tilde{Q}_{n-1}(l/T) + (1-\alpha) \cdot \hat{Q}_{n-1}(l/T) \qquad (9)$$

where α is a factor that determines the time constant for the exponential averaging and n is an index for the pilot symbol period.

The coherence bandwidth may then be estimated by measuring the width of the estimated frequency correlation function, $\hat{Q}(l/T)$. Specifically, the estimated coherence bandwidth, $BW_C$, may be expressed as:

$$BW_C = \frac{L_C + 1}{T}, \qquad \text{Eq (10)}$$

where $L_C$ is the value of l for which $|\tilde{Q}_n(l/T)| \leq \beta |\tilde{Q}_n(0)|$, β is a threshold value between 0 and 1, and T is the sampling interval.

For an OFDM system, a smaller coherence bandwidth (i.e., a larger delay spread) is indicative of increased likelihood of multiple nulls in the frequency domain. Each null corresponds to a frequency region where the channel response is attenuated by a large amount. By properly coding and interleaving the data prior to transmission, signal degradation due to the frequency nulls may be combated by redundancy introduced in the transmitted data. However, as the number of frequency nulls increases, the coding and interleaving become more challenging and other techniques may be used to combat the nulls.

Metrics Related to Time Selectivity (TS Metrics)

Time selectivity of a communication channel may be quantified by coherence time in the time domain or a corresponding Doppler spread in the frequency domain. Coherence time is a measure of the duration over which the channel can be expected not to change appreciably. In the frequency domain, this may be measured by a Doppler spectrum associated with the channel, with the width of the Doppler spectrum being inversely proportional to the channel's coherence time.

Coherence time is a measure of the width of a time correlation function, $C(\Delta t)$, of the channel, which may be expressed as:

$$C(\Delta t) = E[H^*(f,t)H(f,t+\Delta t)], \qquad \text{Eq(11)}$$

where H(*f*,t) is the time-varying channel transfer function, which is described above.

Doppler spread is a measure of the dispersion in the frequency domain caused by time variability of the channel. A Doppler spectrum, D(v), may be expressed as:

$$D(v)=E[\check{H}^*(f,v)\check{H}(f,v)],\qquad \text{Eq (12)}$$

where $\check{H}(f,v)$ is a Doppler spread function, which is the Fourier transform (in the time variable) of the time-varying channel transfer function, H(*f*,t), and may be expressed as:

$$\check{H}(f,v)=\int H(f,t)e^{-j2\pi vt}dt.$$

Because of the Fourier transform relationship between the Doppler spread function, $\check{H}(f,v)$, and the time-varying channel transfer function, H(*f*,t), the Doppler spectrum, D(v), is the Fourier transform of the time correlation function, C(Δt), and may be expressed as:

$$D(v)=\int C(\Delta t)e^{-j2\pi v\Delta t}d\Delta t,\qquad \text{Eq (13)}$$

Because of the Fourier transform relationship between the Doppler spectrum, D(v), and the time correlation function, C(Δt), the Doppler spread is inversely proportional to the coherence time.

An RMS Doppler spread may be defined in a manner similar to the RMS delay spread, as follows:

$$D_{RMS}=\left[\frac{\int (v-\mu_v)^2 D(v)dv}{\int D(v)dv}\right]^{1/2},\qquad \text{Eq (14)}$$

where $\mu_v$ is the first moment of the Doppler spectrum.

To estimate the coherence time of the communication channel in a frequency division duplex system, the transmitter can send a pilot (e.g., a pilot symbol comprised of a constant amplitude tone in each frequency subchannel). The transmitter computes the inverse FFT of the pilot symbol, adds a cyclic prefix, performs D/A conversion on the result, and upconverts and transmits the symbol. The receiver samples the received signal, removes the cyclic prefix, and computes the FFT of the result. This yields a scaled estimate of the frequency-domain sampled channel transfer function, Ĥ(k/T,n), for pilot symbol n.

In a time division duplex system, the transmitter makes a rate decision based on its estimates of the communication channel, which may be derived based on pilot symbols sent by the recipient receiver to which data is to be transmitted, as described above.

An estimate of the time correlation function, Ĉ(l,n), at pilot symbol n may be expressed as:

$$\hat{C}(l,n)=\frac{1}{N}\sum_{k=0}^{N-1}\hat{H}^*(k/T,n-l)\hat{H}(k/T,n),\qquad \text{Eq (15)}$$

where N is the FFT dimension and l represents the time delta (i.e., different quantized values of Δt). To compute estimates of the time correlation function as shown in equation (15) for (L+1) different lagging Δt values (i.e., Ĉ(l,n), for 0≤l≤L), FFT coefficient values for L pilot symbols may be stored and later retrieved as needed.

The channel coherence time may then be estimated based on the estimated time correlation function, Ĉ(l,n). Specifically, the estimated coherence time, $T_C$, may be expressed as:

$$T_C=L_C T_P,\qquad \text{Eq (16)}$$

where $L_C$ is the value of l for which |Ĉ(l/T,n)|≤ρ|Ĉ(0,n)|, ρ is a threshold value between 0 and 1, and $T_P$ is the interval between pilot symbols.

For an OFDM system, the channel coherence time may have an impact on the code selection if it is of the same order of magnitude as the interleaver block size or the code memory (e.g., the block length or the constraint length of the code). Thus, the particular coding scheme to be used may be selected based in part on the estimated channel coherence time.

Performance Metrics

Performance metrics are indicative of the decoded results for the received data. Some performance metrics include FER, PER, BER, and so on.

Different types of decoders may also provide other metrics indicative of the confidence in the decoded results. For example, metrics associated with a convolutional decoder (e.g., a Viterbi decoder) may include a re-encoded symbol error rate (SER), a re-encoded power metric, a "modified" Yamamoto metric, and so on. Metrics associated with a Turbo decoder may include the re-encoded SER, the re-encoded power metric, the minimum or average (log) likelihood ratio among bits in a decoded frame, the number of iterations before declaring the decoded frame, and so on. These metrics are described in further detail in U.S. Patent Application Ser. No. 09/810,685, entitled "Method and Apparatus for Adjusting Power Control Setpoint in a Wireless Communication System," filed Mar. 15, 2001, assigned to the assignee of the present application and incorporated herein by reference. Other performance metrics may also be used and are within the scope of the invention.

Adaptive Rate Control

In accordance with another aspect of the invention, various types of metrics may be used in different manners to adaptively control the rate of a data transmission. In particular, some of the metrics may be used for open-loop control of the rate of the data transmission, other metrics may be used for closed-loop control, and some metrics may be used for both open-loop and closed-loop control.

Figure 2:
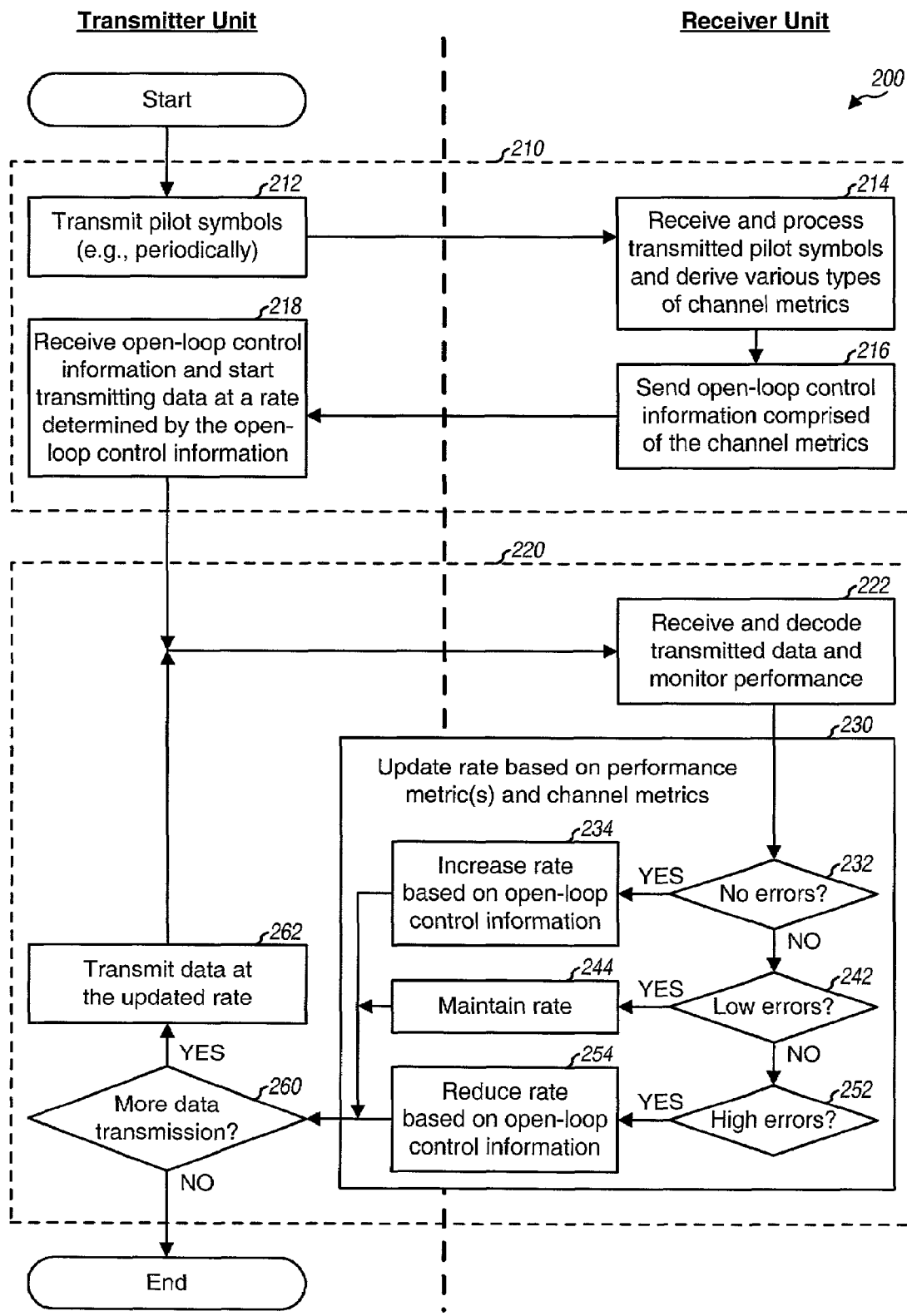
FIG. 2 is a flow diagram of an embodiment of a process for adaptively controlling the rate of a data transmission.

FIG. 2 is a flow diagram of an embodiment of a process 200 for adaptively controlling the rate of a data transmission. The transmitter (e.g., periodically) transmits a pilot symbol that may be used for various functions at the receiver, including channel estimation, at step 212. While idle, the receiver monitors (i.e., receives and processes) the transmitted pilot symbols and derives various types of channel metrics, at step 214. The channel metrics may be derived on an on-going basis, or prior to requesting a data transmission, or after being informed of an upcoming data transmission, or based on some event or conditions. The channel metrics may include those relating to SNR, frequency selectivity, and/or time selectivity, as described above. For example, the pre-detection SNR may be estimated for the received pilot symbols, the channel coherence bandwidth (or delay spread) may be estimated for frequency selectivity of the channel, and the channel coherence time (or Doppler spread) may be estimated for time selectivity of the channel.

Prior to commencement of a data transmission, the receiver provides open-loop control information to the transmitter, at step 216. The open-loop control information may be exchanged via a handshake (or signaling) on a signaling channel.

In an embodiment, the open-loop control information comprises the channel metrics (e.g., in the form of "raw" values for the metrics) determined at the receiver. In another embodiment, the open-loop control information comprises an initial rate determined at the receiver based on the channel metrics as input parameters. In either case, the rate selection may be performed (at the transmitter or receiver) based on a multi-dimensional look-up table or by some other means. For example, a three-dimensional look-up table may be used where three input parameters (e.g., estimated SNR, channel coherence bandwidth, $BW_C$, and channel coherence time, $T_C$) map to a rate. The mapping between the channel metrics and rate may be determined by various means such as, for example, empirical measurement, computer simulation, and so on.

Once an initial rate has been selected or determined based on the open-loop control information, the transmitter starts transmitting data at the selected rate, at step 218. The receiver receives and decodes the transmitted data and monitors the performance (e.g., the frame error rate) of the data transmission, at step 222. Based on the observed frame error rate and possibly the channel metrics, the receiver may update the rate, at step 230. An embodiment of step 230 (which may be performed by the receiver or the transmitter, or both) is described below.

In an embodiment, as long as no frame errors occur, as determined in step 232, the receiver or transmitter continues to determine a (new) rate based on the open-loop control information, at step 234. If the new rate indicates an increase in rate, then a rate increase request results. If the new rate does not indicate a rate increase, but the data transmission remains error free over some particular time duration, then a rate increase request may also result. Other criteria may also be applied to the open-loop control information to determine a new rate in the error-free case.

In an embodiment, if the frame error rate remains low, as determined in step 242, then the rate is maintained (i.e., remains unchanged) and no rate increase or decrease requests are made, at step 244. The frame error rate may be deemed as low if it falls within some specified range (e.g., 0.01% to 1%). If the frame error rate subsequently falls below the lower bound of this range (below 0.01%), then the channel is considered to be error-free, and the rate selection mechanism for this case then applies.

In an embodiment, if the frame error rate is high, as determined in step 252, then a rate reduction request results, at step 254. The frame error rate may be deemed as high if it exceeds the upper bound of the specified range (above 1%). In an embodiment, a new rate may be determined based on the open-loop control information. If the new rate is the same or greater than the current rate, then a rate reduction request may still be sent. And if the new rate is less than the current rate, then the rate reduction request uses the new rate.

For all cases, if data transmission is to continue, as determined in step 260, then the transmitter adjusts the data transmission based on the updated rate (which may be the same as the prior rate, or an increase or decrease from the prior rate), at step 262. Otherwise, if there is no more data to transmit, then the process terminates.

The channel metrics may be updated periodically (e.g., as pilot symbols are received) during the data transmission. In this way, the new rates can be determined based on up-to-date channel state information.

Block 210 generally includes the steps that perform the open-loop control of the rate of a data transmission, and block 220 generally includes the steps that perform the closed-loop control of the rate. The closed-loop control may also be viewed as including some of the elements of the open-loop control since the receiver (continually or periodically) receives and processes the pilot symbols, derives the channel metrics, and determines new rates based (in part) on the updated channel metrics (this is not shown in FIG. 2 for simplicity).

As noted above, nulls in the channel response degrade the transmitted signal and increase the likelihood that the data will not be decoded error-free at the receiver. In an embodiment, depending on the channel response, all or only a subset of the available frequency subchannels may be selected for use. The determination of whether to use all or only a subset of the frequency subchannels may be made, for example, based on the estimated channel coherence bandwidth, $BW_C$. If the estimated coherence bandwidth indicates a high likelihood of multiple nulls in the channel, then frequency subchannels having gains or SNRs below a particular selection threshold may be eliminated from use for data transmission.

A scheme for determining the selection threshold and for selecting transmission channels for use is described in U.S. patent application Ser. No. 09/860,274, filed May 17, 2001, U.S. patent application Ser. No. 09/881,610, filed Jun. 14, 2001, and U.S. patent application Ser. No. 09/892,345, filed Jun. 26, 2001, all three entitled "Method and Apparatus for Processing Data for Transmission in a Multi-Channel Communication System Using Selective Channel Inversion," assigned to the assignee of the present application, and incorporated herein by reference.

Example OFDM System

Figure 3:
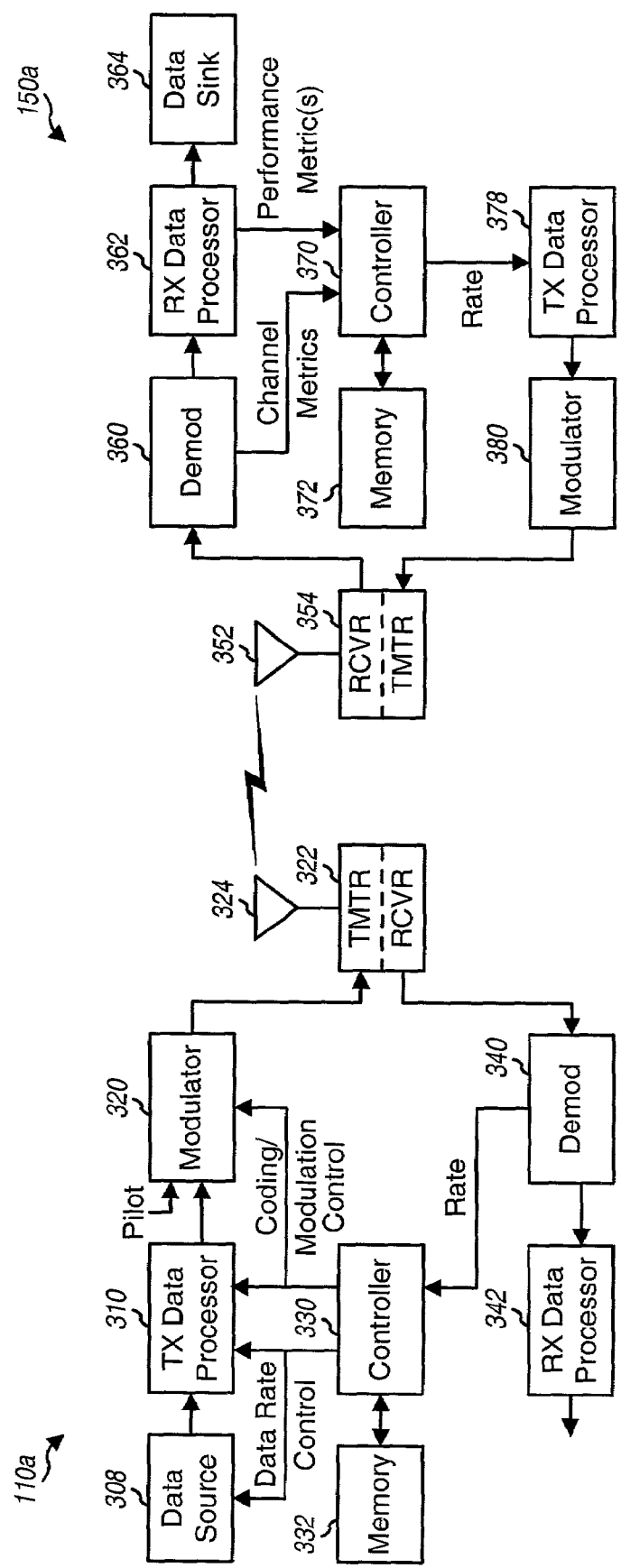
FIG. 3 is a simplified block diagram of an embodiment of a transmitter system and a receiver system capable of implementing various aspects and embodiments of the invention.

FIG. 3 is a simplified block diagram of an embodiment of a transmitter system 110a and a receiver system 150a, which are capable of implementing various aspects and embodiments of the invention.

At transmitter system 110a, traffic data is provided at a particular data rate from a data source 308 to a transmit (TX) data processor 310, which formats, interleaves, and codes the traffic data based on a particular coding scheme to provide coded data. The data rate and the coding and interleaving may be determined by a data rate control and a coding control, respectively, provided by a controller 330. The coding increases the reliability of the data transmission. The interleaving provides time diversity for the coded bits, permits the data to be transmitted based on an average SNR for the frequency subchannels used for the data transmission, combats fading, and further removes correlation between coded bits used to form each modulation symbol. The interleaving may further provide frequency diversity if the coded bits are transmitted over multiple frequency subchannels.

The coded data is then provided to a modulator 320, which may also receive pilot data (e.g., data of a known pattern and processed in a known manner, if at all). The pilot data may be multiplexed with the coded traffic data, e.g., using time division multiplex (TDM) or code division multiplex (CDM), in all or a subset of the frequency subchannels used to transmit the traffic data. In a specific embodiment, for an OFDM system, the processing by modulator 320 includes (1) modulating the received data with a particular modulation scheme, (2) transforming the modulated data to form OFDM symbols, and (3) appending a cyclic prefix to each OFDM symbol to form a corresponding transmission symbol. The modulation is performed based on a modulation control provided by controller 330. The processing by modulator 320 is described in further detail below. The modulated data (i.e., the transmission symbols) is then provided to a transmitter (TMTR) 322.

Transmitter 322 converts the modulated data into one or more analog signals and further conditions (e.g., amplifies, filters, and quadrature modulates) the analog signals to generate a modulated signal suitable for transmission over the communication channel. The modulated signal is then transmitted via an antenna 324 to the receiver system.

At receiver system 150a, the transmitted modulated signal is received by an antenna 352 and provided to a receiver (RCVR) 354. Receiver 354 conditions (e.g., filters, amplifies, and downconverts) the received signal and digitizes the conditioned signal to provide data samples. A demodulator (Demod) 360 then receives and processes the data samples to provide demodulated data. For the OFDM system, the processing by demodulator 360 may include (1) removing the cyclic prefix in each recovered transmission symbol, (2) transforming each recovered OFDM symbol, and (3) demodulating the recovered modulation symbols in accordance with a demodulation scheme complementary to the modulation scheme used at the transmitter system. The processing by demodulator 360 is described in further detail below.

A receive (RX) data processor 362 then decodes the demodulated data to recover the transmitted traffic data. The processing by demodulator 360 and RX data processor 362 is complementary to that performed by modulator 320 and TX data processor 310, respectively, at transmitter system 110a.

As shown in FIG. 3, demodulator 360 may derive various types of channel metrics and provide these to a controller 370. RX data processor 362 may also derive and provide the status of each received frame and/or one or more other performance metrics indicative of the decoded results. Based on the various types of metrics, controller 370 may determine or select a new rate for the data transmission. Control information in the form of a selected rate (as shown in FIG. 3) or the metrics themselves may be provided by controller 370, processed by a TX data processor 378, modulated by a modulator 380, and conditioned and transmitted by a transmitter 354 back to transmitter system 110a.

At transmitter system 110a, the modulated signal from receiver system 150a is received by antenna 324, conditioned by a receiver 322, and demodulated by a demodulator 340 to recover the control information transmitted by the receiver system. The control information (e.g., the selected rate) is then provided to controller and used to generate the data rate, coding, and modulation controls for the data transmission.

Controllers 330 and 370 direct the operation at the transmitter and receiver systems, respectively. Memories 332 and 372 provide storage for program codes and data used by controllers 330 and 370, respectively.

FIG. 4A is a block diagram of a transmitter unit 400a, which is an embodiment of the transmitter portion of transmitter system 110a. Transmitter unit 400a includes (1) a TX data processor 310a that receives and processes traffic data to provide coded data and (2) a modulator 320a that modulates the coded traffic data and pilot data to provided modulated data. TX data processor 310a and modulator 320a are one embodiment of TX data processors 310 and modulator 320, respectively, in FIG. 3.

In the specific embodiment shown in FIG. 4A, TX data processor 310a includes an encoder 412 and a channel interleaver 414. Encoder 412 receives and codes the traffic data in accordance with a particular coding scheme to provide coded bits. The selected coding scheme may include any combination of cyclic redundancy check (CRC), convolutional coding, Turbo coding, block coding, and other coding, or no coding at all. In a specific embodiment, the traffic data may be partitioned into frames (or packets). For each frame, the data may be used to generate a set of CRC bits, which are appended to the data, and the data and CRC bits may then be interleaved and coded with a convolutional code or a Turbo code to generate the coded data for the frame. Channel interleaver 414 interleaves the coded bits based on a particular interleaving scheme to provide diversity.

In the specific embodiment shown in FIG. 4A, modulator 320a includes a symbol mapping element 422, an inverse fast Fourier transformer (IFFT) 428, and a cyclic prefix generator 430. Symbol mapping element 422 maps the multiplexed pilot data and coded traffic data to modulation symbols for one or more frequency subchannels used for data transmission. The modulation may be achieved by grouping sets of received bits to form non-binary symbols and mapping each non-binary symbol to a point in a signal constellation corresponding to a particular modulation scheme (e.g., QPSK, M-PSK, M-QAM, or some other scheme) determined by the modulation control. Each mapped signal point corresponds to a modulation symbol. Symbol mapping element 422 then provides a vector of modulation symbols for each transmission symbol period, with the number of modulation symbols in each vector corresponding to the number of frequency subchannels selected for use for that transmission symbol period.

IFFT 428 converts each modulation symbol vector into its time-domain representation (which is referred to as an OFDM symbol) using IFFT. IFFT 428 may be designed to perform the IFFT on any number of frequency subchannels (e.g., 8, 16, 32, . . . , $N_F$, . . . ). In an embodiment, for each OFDM symbol, cyclic prefix generator 430 repeats a portion of the OFDM symbol to form a corresponding transmission symbol. The cyclic prefix ensures that the transmission symbol retains its orthogonal properties in the presence of multipath delay spread, thereby improving performance against deleterious path effects. The transmission symbols from cyclic prefix generator 430 are then provided to transmitter 322 (see FIG. 3) and processed (e.g., converted into an analog signal, modulated, amplified, and filtered) to generate a modulated signal, which is then transmitted from antenna 324.

FIG. 4B is a block diagram of a transmitter unit 400b, which is another embodiment of the transmitter portion of transmitter system 110a. As shown in FIG. 4B, transmitter unit 400b includes a TX data processor 310b coupled to a modulator 320b. Modulator 320b includes symbol mapping element 422, a symbol weighting element 424, a spreader 426, IFFT 428, and cyclic prefix generator 430.

Symbol mapping element 422 maps the multiplexed pilot data and coded traffic data to modulation symbols. Symbol weighting element 424 weighs the modulation symbols for each selected frequency subchannel based on a respective weight to provide weighted modulation symbols. The weight for each selected frequency subchannel may be determined, for example, based on that channel's gain or SNR. Spreader 426 then spreads the weighted modulation symbols in the frequency domain to provide spread data. Spreading may be used, for example, for lower data rates (e.g., less than 1 bps/Hz). The spread data is then transformed to OFDM symbols by IFFT 428, and each OFDM symbol is appended with a cyclic prefix by cyclic prefix generator 430 to provide a corresponding transmission symbol. An example OFDM system that employs spreading is describe in U.S. Patent Application Ser. No. 09/982,280, entitled "Multiple-Access Hybrid OFDM-CDMA System," filed Oct. 18, 2001, assigned to the assignee of the present application and incorporated herein by reference.

Other designs for the transmitter unit may also be implemented and are within the scope of the invention. For example, a transmitter unit may be designed with a modulator having all the elements in modulator 320b except for symbol weighting element 424. The implementation of encoder 412, channel interleaver 414, symbol mapping element 422, IFFT 428, and cyclic prefix generator 430 is known in the art and not described in detail herein.

The coding and modulation for OFDM and other systems are described in further detail in the aforementioned U.S. patent application Ser. Nos. 09/826,481, 09/956,449, and 09/854,235, and U.S. patent application Ser. No. 09/776,075, entitled "Coding Scheme for a Wireless Communication System," filed Feb. 1, 2001, assigned to the assignee of the present application and incorporated herein by reference.

An example OFDM system is described in U.S. patent application Ser. No. 09/532,492, entitled "High Efficiency, High Performance Communication System Employing Multi-Carrier Modulation," filed Mar. 30, 2000, assigned to the assignee of the present invention and incorporated herein by reference. OFDM is also described in a paper entitled "Multicarrier Modulation for Data Transmission: An Idea Whose Time Has Come," by John A.C. Bingham, IEEE Communications Magazine, May 1990, which is incorporated herein by reference.

Figure 5:
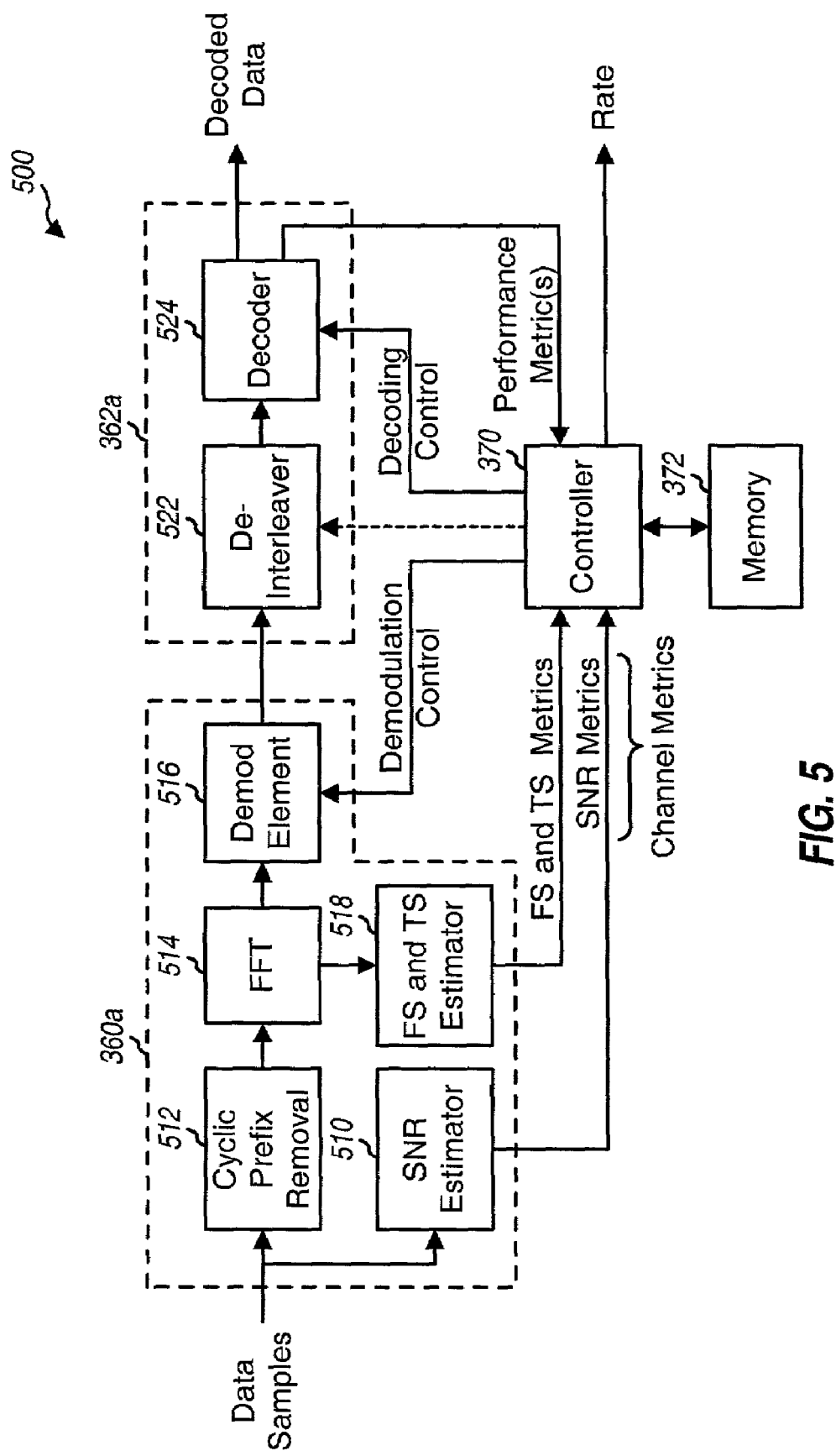
FIG. 5 is a block diagram of an embodiment of a receiver unit within the receiver system.

FIG. 5 is a block diagram of an embodiment of a receiver unit 500, which is one embodiment of the receiver portion of receiver system 150a in FIG. 3. The transmitted signal from the transmitter system is received by antenna 352 (FIG. 3) and provided to receiver 354 (which may also be referred to as a front-end processor). Receiver 354 conditions (e.g., filters and amplifies) the received signal, downconverts the conditioned signal to an intermediate frequency or baseband, and digitizes the downconverted signal to provide data samples, which are then provided to a modulator 360a.

Within demodulator 360a (FIG. 5), the data samples are provided to a cyclic prefix removal element 512, which removes the cyclic prefix in each transmission symbol to provide a corresponding recovered OFDM symbol. A fast Fourier transformer (FFT) 514 then transforms each recovered OFDM symbol and provides a vector of (up to $N_F$) recovered modulation symbols for the (up to $N_F$) frequency subchannels used for data transmission for that transmission symbol period. The recovered modulation symbols from FFT processor 514 are provided to a demodulation element 516 and demodulated in accordance with a demodulation scheme that is complementary to the modulation scheme used at the transmitter system. The demodulated data from demodulation element 516 are then provided to a RX data processor 362a.

Within RX data processor 362a, the demodulated data is de-interleaved by a de-interleaver 522 in a manner complementary to that performed at the transmitter system, and the de-interleaved data is further decoded by a decoder 524 in a manner complementary to that performed at the transmitter system. For example, a Turbo decoder or a Viterbi decoder may be used for decoder 524 if Turbo or convolutional coding, respectively, is performed at the transmitter unit. The decoded data from decoder 524 represents an estimate of the transmitted data.

As shown in FIG. 5, an SNR estimator 510 may be designed to derive and provide one or more SNR metrics (e.g., pre-detection SNR, post-detection SNR, or both) to controller 370. The pre-detection SNR may be derived based on the received data samples for the pilot symbols, and the post-detection SNR may be derived based on post-processed data samples for the pilot symbols, i.e., after some signal processing on the received data samples.

In the embodiment shown in FIG. 5, a frequency selectivity (FS) and time selectivity (TS) estimator 518 receives the FFT coefficient values from FFT 514 and may derive one or more metrics for frequency selectivity and/or one or more metrics for time selectivity. For example, estimator 518 may estimate the coherence bandwidth, $BW_C$, as shown in equations (8) through (10), and the coherence time, $T_C$, as shown in equations (15) and (16). Estimator 518 may also be designed to derive and provide other metrics for frequency and/or time selectivity, and this is within the scope of the invention.

Pilot

As noted above, a pilot may be transmitted from the transmitter system and used at the receiver system for various functions. Various pilot transmission schemes may be implemented and are within the scope of the invention.

In one pilot transmission scheme, pilot data is time division multiplexed (TDM) with the coded traffic data to implement a TDM pilot structure. The pilot may be time division multiplexed at fixed intervals with the traffic data (e.g., one pilot symbol for each $N_P$ data symbols), or may be multiplexed in a non-uniform manner (e.g., inserted at pseudo-randomly selected time intervals). The TDM pilot structure may also be implemented similarly to that described in IS-856 or W-CDMA standard, which are incorporated herein by reference.

In another pilot transmission scheme, a subset of the available frequency subchannels is reserved and used to transmit pilot tones (i.e., no traffic data). The subset of frequency subchannels may be changed (i.e., hopped) in a deterministic manner or a pseudo-random manner to allow the entire channel response to be sampled over multiple OFDM symbols.

In yet another pilot transmission scheme, pilot data is code division multiplexed (CDM) with the coded traffic data in either the time domain or the frequency domain. In this case, the pilot data may be spread with a known spreading code and summed with the coded traffic data, which may have been spread with other spreading codes.

In general, a pilot may be transmitted such that the receiver systems are able to estimate the channel response for each sub-band used for data transmission.

FIGS. 1 and 3 show a simple design whereby the receiver sends back the rate for the data transmission. Other designs may also be implemented and are within the scope of the invention. For example, the channel and performance metrics may be sent to the transmitter (instead of the rate), which may then determine the rate for the data transmission based on the received metrics.

The adaptive rate control techniques described herein may be implemented using various designs. For example, channel estimator 162 in FIG. 1 used to derive and provide the channel metrics may be implemented by various elements in a receiver system, such as estimators 510 and 518 in FIG. 5. Some or all of the elements for deriving the channel metrics may also be implemented within controller 370. Decoder 524 may be designed to provide a frame status for each received frame, in which case the computation to derive the frame error rate may be performed by controller 370.

Controller 370 may also be designed to implement rate selector 166 in FIG. 1 (e.g., with a look-up table stored within memory 372). Other designs for implementing the adaptive rate control may also be contemplated and are within the scope of the invention.

The adaptive rate control techniques described herein may be implemented by various means. For example, these techniques may be implemented in hardware, software, or a combination thereof. For a hardware implementation, some of the elements used to implement adaptive rate control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some portions of the adaptive rate control may be implemented with modules (e.g., procedures, functions, and so on) that perform the functions described herein. The software codes may be stored in a memory unit (e.g., memory 332 or 372 in FIG. 3) and executed by a processor (e.g., controller 330 or 370). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein

What is claimed is:

1. A method for controlling a rate of a data transmission over a communication channel, comprising:
   estimating a channel transfer function for a communication channel,
   estimating a frequency correlation function for the communication channel based on the estimated channel transfer function,
   estimating a coherence bandwidth based on the estimated frequency correlation function;
   deriving a plurality of channel metrics of a plurality of types and indicative of a plurality of characteristics of a communication channel used for the data transmission, the plurality of channel characteristics including at least one channel metric related to the estimated coherence bandwidth;
   determining an initial rate for the data transmission based on the derived channel metrics;
   updating the channel metrics during the data transmission; and
   adjusting the rate based on the updated channel metrics.

2. The method of claim 1, wherein the coherence bandwidth is further estimated by
   averaging the estimated frequency correlation function aver a particular time interval, and
   wherein the coherence bandwidth is estimated based on the averaged estimated frequency correlation function.

3. The method of claim 1 further comprising:
   deriving one or more performance metrics indicative of performance of the data transmission, and
   wherein the rate adjusting is performed based on the one or more performance metrics.

4. The method of claim 3, wherein the one or more performance metrics is used to determine whether or not to adjust the rate.

5. The method of claim 2, wherein the one or more performance metrics includes a frame error rate (FER).

6. The method of claim 5, wherein the rate is maintained if the frame error rate is within a particular range.

7. The method of claim 6, wherein the rare is reduced if the frame error rate is above the particular range.

8. The method of claim 7, wherein the reduced rate is determined based on the updated channel metrics.

9. The method of claim 6, wherein the rate is increased based on the updated channel metrics if the frame error rate is below the particular range.

10. The method of claim 9, wherein the increased rate is determined based on the updated channel metrics.

11. The method of claim 1, wherein the rate is indicative of a particular coding and modulation scheme to be used for the data transmission.

12. The method of claim 1, wherein the plurality of channel metrics include at least one channel metric of a first type and related to signal-to-noise-plus-interference ratio (SNR) of the communication channel.

13. The method of claim 12, wherein the at least one channel metric of the first type includes an estimated pre-detection SNR.

14. The method of claim 12, wherein the at least one channel metric of the first type includes an estimated post-detection SNR.

15. The method of claim 1, wherein the channel metrics are derived based on a pilot included in a received signal.

16. The method of claim 1, wherein at least one channel metric is derived based on FFT coefficient values.

17. The method of claim 1, wherein the wireless communication system is an orthogonal frequency division modulation (OFDM) system.

18. The method of claim 1, further comprising transmitting an indication of the rate.

19. The method of claim 1, further comprising transmitting an indication of the new rate.

20. A method for controlling a rare of a data transmission over a communication channel, comprising:
   estimating a channel transfer function for a communication channel for each of a plurality of time instances,
   estimating a time correlation function for the communication channel based on the estimated channel transfer functions for the plurality of time instances,
   estimating a coherence time based on the estimated time correlation function;
   deriving a plurality of channel metrics of a plurality of types and indicative of a plurality of characteristics of a communication channel used for the data transmission, the plurality of channel characteristics including at least one channel metric related to the estimated coherence time;
   determining an initial rate for the data transmission based on the derived channel metrics;
   updating the channel metrics during the data transmission; and
   adjusting the rate based on the updated channel metrics.

21. The method of claim 20, further comprising:
deriving one or more performance metrics indicative of performance of the data transmission, and
wherein the rate adjusting is performed based on the one or more performance metrics.

22. The method of claim 21, wherein the one or more performance metrics includes a frame error rate (FER).

23. The method of claim 22, wherein the rate is maintained if the frame error rate is within a particular range.

24. The method of claim 23, wherein the rate is reduced if the frame error rate is above the particular range.

25. The method of claim 24, wherein the reduced rate is determined based on the updated channel metrics.

26. The method of claim 23, wherein the rate is increased based on the updated channel metrics if the frame error rate is below the particular range.

27. The method of claim 26, wherein the increased rate is determined based on the updated channel metrics.

28. A receiver unit in a wireless communication system, comprising:
a channel estimator operative to derive a plurality of channel metrics of a plurality of types and indicative of a plurality of characteristics of a communication channel used for a data transmission and to update the channel metrics during the data transmission, wherein the channel estimator is configured to estimate a frequency selectivity as one of the channel metrics by estimating a coherence bandwidth of the channel based on an estimated frequency correlation function and an estimated frequency correlation function; and
a rate selector operative to determine an initial rate for the data transmission based on the derived channel metrics and to adjust the rate based on the updated channel metrics.

29. The receiver unit of claim 28, further comprising:
a decoder operative to provide a status of the performance of the data transmission, and
wherein the rate selector is further operative to adjust the rate based on the status from the decoder.

30. The receiver unit of claim 28, wherein the channel estimator is further operative to derive and provide at least one channel metric of a first type and related to signal-to-noise-plus-interference ratio (SNR) of the communication channel.

31. The receiver unit of claim 28, wherein the channel estimator is further operative to derive and provide at least one channel metric of a second type and related to frequency selectivity of the communication channel.

32. A receiver apparatus in a wireless communication system, comprising:
means for deriving a plurality of channel metrics of a plurality of types and indicative of a plurality of characteristics of a communication channel used for a data transmission and for estimating a frequency selectivity as one of the channel metrics by estimating a coherence bandwidth of the channel based on an estimated frequency correlation function and an estimated frequency correlation function;
means for determining an initial rate for the data transmission based on the derived channel metrics;
means for updating the channel metrics during the data transmission; and
means for adjusting the rate based on the updated channel metrics.

33. The apparatus of claim 32, further comprising transmitting an indication of the rate.

34. The apparatus of claim 32, further comprising transmitting an indication of the new rate.

35. The apparatus of claim 32, wherein the one or more metrics includes a frame error rate (FER).

36. The apparatus of claim 35, wherein the rate is maintained if the frame error rate is within a particular range.

37. The apparatus of claim 36, wherein the rate is reduced if the frame error rate is above the particular range.

38. The apparatus of claim 37, wherein the reduced rate is determined based on the updated channel metrics.

39. The apparatus of claim 36, wherein the rate is increased based on the updated channel metrics if the frame error rate is below the particular range.

* * * * *